United States Patent [19]

La Mura et al.

[11] Patent Number: 4,473,991
[45] Date of Patent: Oct. 2, 1984

[54] HARNESS CONNECTOR

[76] Inventors: Joseph L. La Mura; Guy R. La Mura, both of 367 Passaic Ave., West Caldwell, N.J. 07006

[21] Appl. No.: 434,609

[22] Filed: Dec. 8, 1982

[51] Int. Cl.³ .............................. B68B 1/00; B62C 5/02
[52] U.S. Cl. .............................................. 54/2; 280/75; 403/56
[58] Field of Search .................. 54/2, 39, 50, 51; 403/56, 114; 280/63, 75

[56] References Cited

U.S. PATENT DOCUMENTS

| | | | |
|---|---|---|---|
| 746,360 | 12/1903 | McAdams | 403/56 X |
| 2,687,024 | 8/1954 | George | 403/114 X |
| 3,124,971 | 3/1964 | Peters et al. | 403/56 X |
| 3,367,616 | 2/1968 | Bausch et al. | 403/56 X |
| 4,072,000 | 2/1978 | Clemens | 54/2 |
| 4,326,367 | 4/1982 | Cashman | 54/51 X |

OTHER PUBLICATIONS

Catalog No. 480, Aurora Bearing Company.
"The Wishbone: Is it Here to Stay?" *Hoofbeats*, Jan. 1982, pp. 55–58.

*Primary Examiner*—Robert P. Swiatek

[57] ABSTRACT

A harness connector includes a link connected to a harness with a first ball joint and to a sulky shaft with a second ball joint permitting horse leaning and lateral motion relative to the sulky shafts.

23 Claims, 9 Drawing Figures

HARNESS CONNECTOR

This invention relates to a connector for coupling a harness to a shaft.

In one kind of race, a horse is hooked up to or connected to a sulky or cart. The driver sits in the sulky to control the animal in the race. The sulky usually comprises a metal frame attached to a pair of wheels. The driver's seat is on the frame between the wheels. A shaft secured to the frame extends forward of the driver on each side of the sulky. The forward end of each shaft is strapped securely to a leather harness which encircles the horse slightly to the rear of its front legs around the horse's belly. The harness is a relatively large strap and the shaft straps are relatively smaller. The shaft straps securely fasten the sulky shaft to the harness such that the horse is securely fastened between and to the two shafts. This arrangement is now without problems.

As those horse runs it tends to sway from side to side during a straight run. This causes the shafts to also sway. Such action may also cause the trailing sulky to sway and could cause loss of race time or, possibly, loss of control of the animal. As the horse goes around a curve, the animal is forced by the secure attachment to the cart to remain upright. This is unnatural for the animal. As it runs in a circle, centrifugal forces tend to cause the animal to lean into the curve such as is readily observably when a motor bike rounds a curve and for the same reason that roadways are banked in curves. Horses therefore must be trained to race in the unusual upright position during the curved portion of a race. However, the horse when it does run in a curved path, tends to cause the shafts, and thus the sulky, to slip sideways. This action also may cause loss of time in the race and also possible overturning of the sulky.

One proposed solution to the above problems with conventional harnesses includes a yoke arrangement as described in more detail in *Hoof Beats*, January, 1982, pages 55-58 in an article entitled "The Wishbone: Is it her to stay?" The yoke is a somewhat inverted U shaped member in which each leg of the U depends over a side of the horse. The center of the U is attached to a harness encircling the horse's midsection by a ball connecting link over the horse's back. The sulky shafts are each connected to a leg of the yoke on a side of the animal by straps. These straps tightly secure a shaft to the yoke leg. The ball bearing connection at the top of the harness is to permit the horse to lean during turns while the yoke remains in relatively fixed position whether in a turn or on a straight run. However, there appears to be problems with this system for reasons not understood.

In the alternative to employing straps to connect the sulky shafts to a harness connecting links have been used. These links comprise a clamp which is attached to the forward end of the sulky shaft. The clamp has a hole. A second member including a connector pin received in the hole is clamped to the harness. The pin is loosely locked to shaft clamp by a locking pin passing through a hole in the connector pin. Once secured, this connector arrangement locks the horse to the sulky shaft permitting relatively little motion between the horse and the sulky shaft other than a tilting action as would occur if the animal were to rear up on its hind legs. There is little lateral motion present between the harness and the shaft to a degree necessary to permit the horse to lean in a turn relative to the sulky shafts.

In accordance with the present invention a harness connector for coupling a shaft to harness comprises a link member having first and second ends. First ball joint means include means for pivotally connecting the first end to the harness. A second ball joint means pivotally connects the second end to the shaft. As a result the link member is able to move relative to the shaft and harness to permit displacement of the harness relative to the shaft.

IN THE DRAWING

Figure 1:
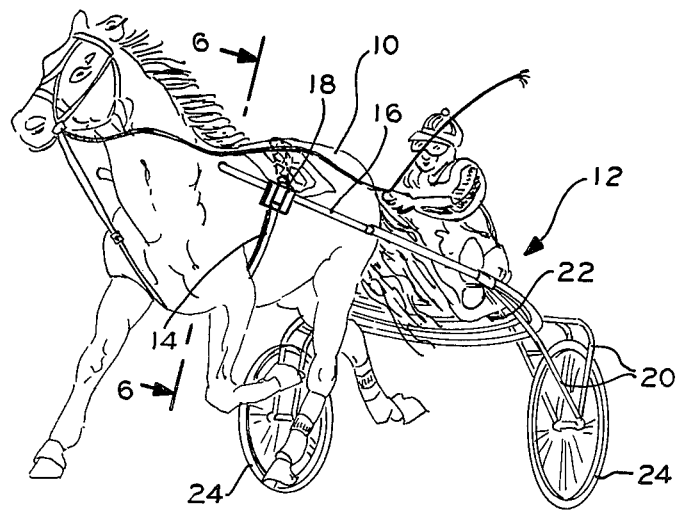
FIG. 1 is a perspective elevation view of a horse connected to a sulky with a connector in accordance with an embodiment of the present invention.
Figure 4:
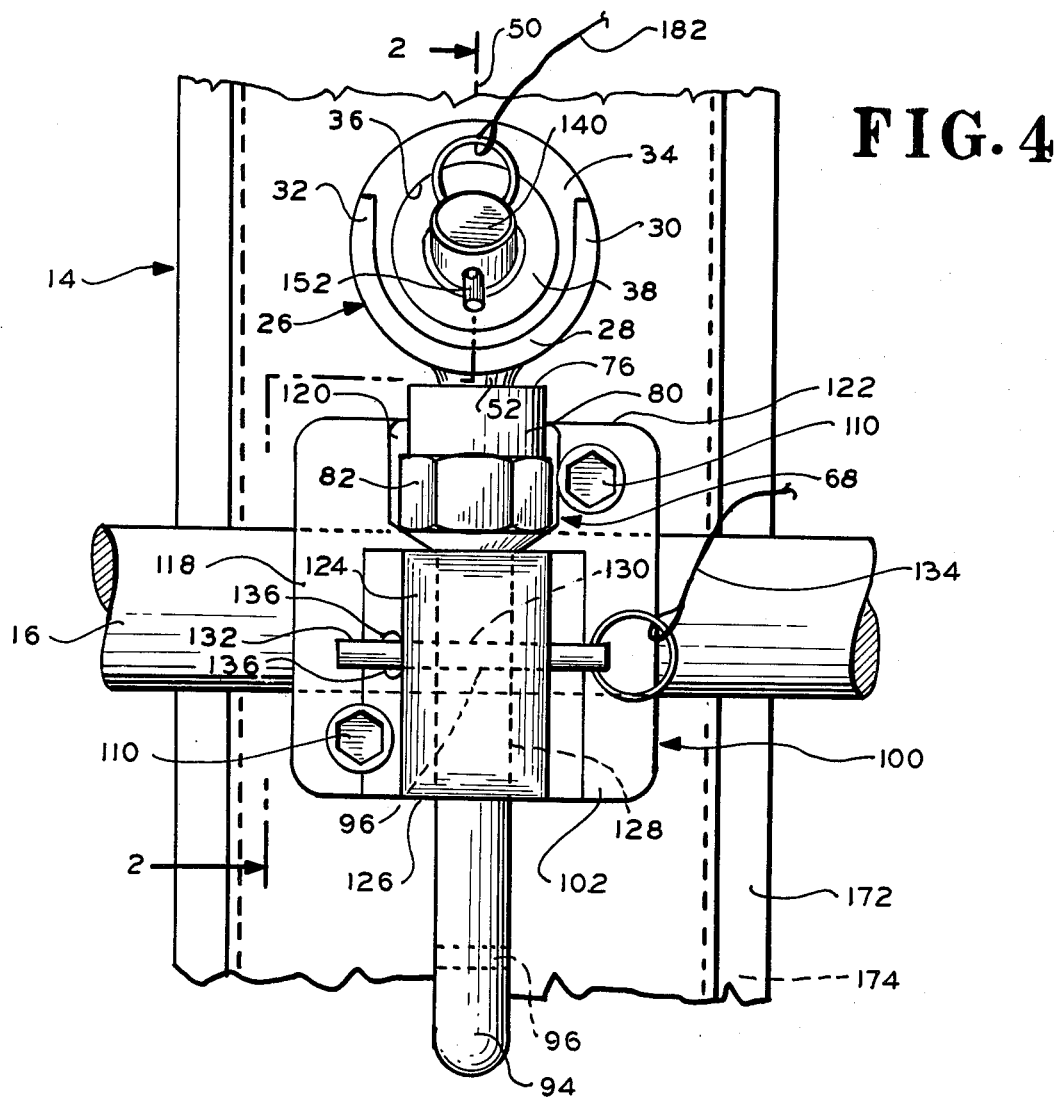
Figure 5:
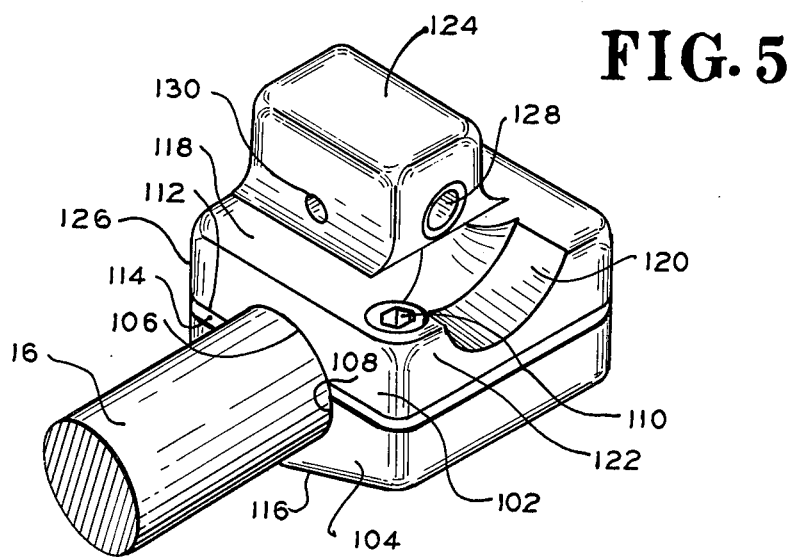
Figure 6:
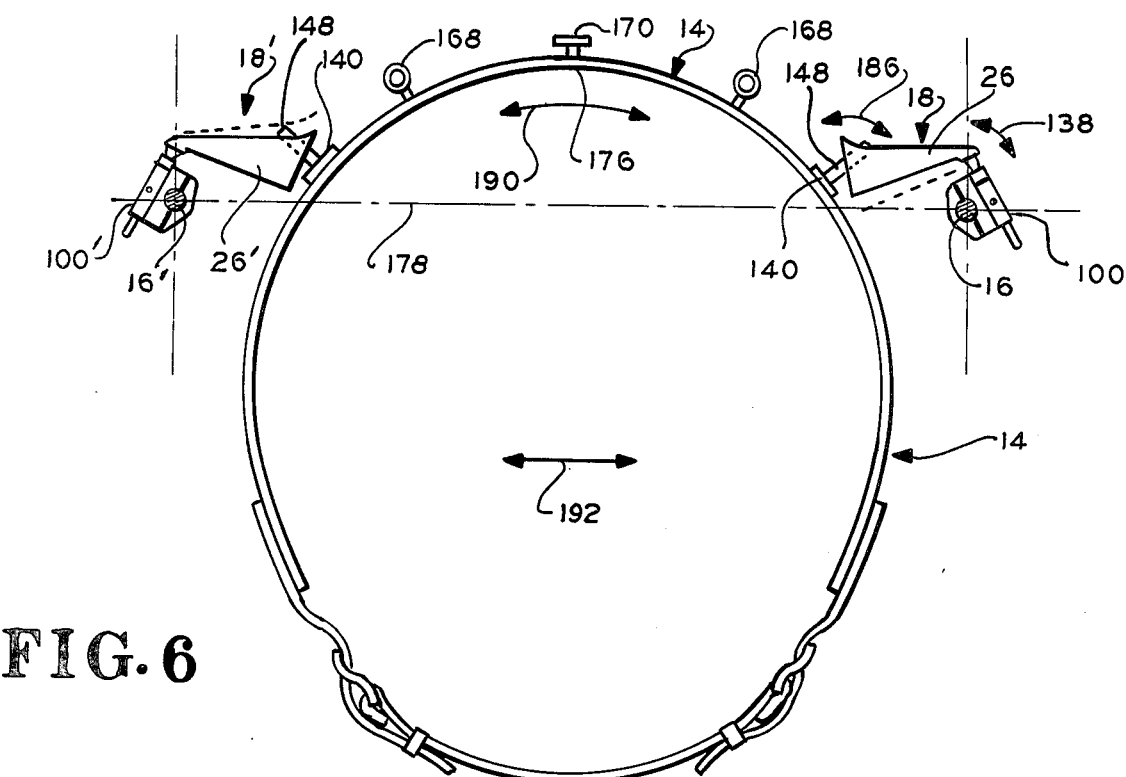
Figure 7:
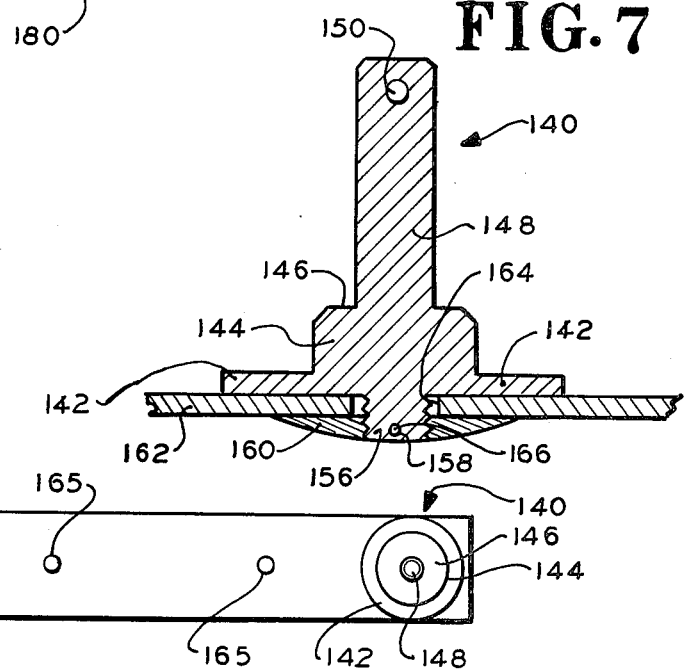
Figure 8:
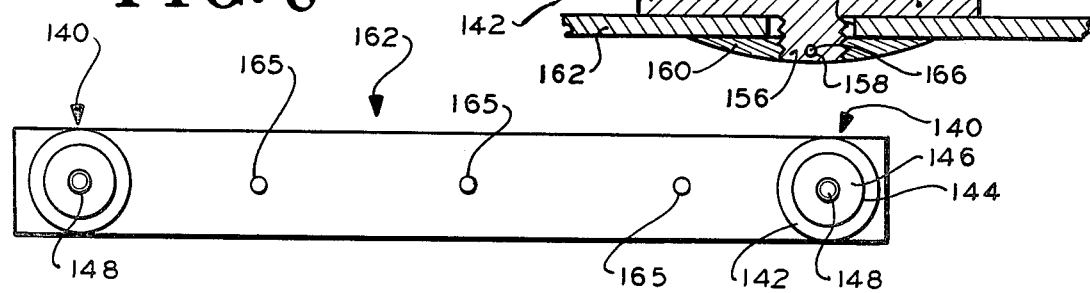
Figure 9:
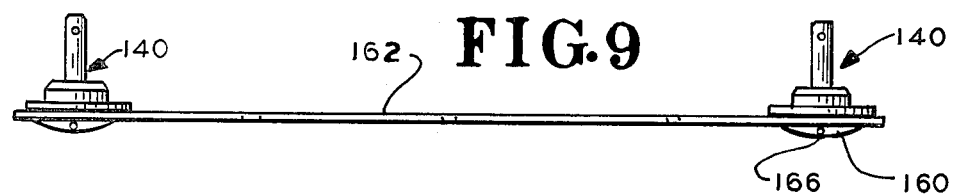

FIG. 4 is a more detailed view of the connector of FIG. 1 similar to the view in FIG. 1, FIG. 5 is an isometric view of a clamp used in the embodiment of FIG. 1, FIG. 6 is a sectional view of the harness-shaft-connector embodiment of FIG. 1 taken along lines 6—6 of FIG. 1, FIG. 7 is a sectional view showing construction detail of a connector pin secured to the harness, and FIGS. 8 and 9 are respective plan and side elevation views of a pin and strap assembly employed in the embodiment of FIG. 1.

In FIG. 1 race horse 10 pulls sulky 12 via harness 14 attached to a pair of shafts 16, 16' (one being shown), a shaft 16, 16' on each side of horse 10. The harness 14 is attached to shafts 16, 16' by corresponding connectors 18, 18', a connector 18' being on the other side of horse 10 connected to the other shaft 16' on that other side. Shafts 16, 16' are connected to frame 20 of the sulky 12. Seat 22 is supported by frame 20 secured to two wheels 24.

The shafts 16, 16' straddle the horse 10 with the frame 20 to the rear of the horse. Shafts 16, 16' are fixedly secured to frame 20. The shafts 16, 16' may be somewhat flexible because of their length and relatively small diameter, they form a unitary stiff structure with frame 20. That is, there is little relative motion between the shafts 16, 16' and frame 20. Thus motions transmitted to shafts 16, 16' can readily be transmitted to the frame 20.

In a race, the horse 10 tends to move up and down and from side to side. In the turns, the horse tends to lean toward one side or the other, e.g., toward one shaft 16 and away from the other shaft 16'. Connectors 18, 18' permit such relative motion of the horse 10 with respect to shafts 16, 16' and yet provide a secure connection between the harness 14 and shafts 16, 16', i.e., there is negligible slippage between harness 14 and shafts 16, 16' as the horse pulls the sulky.

Figure 2:
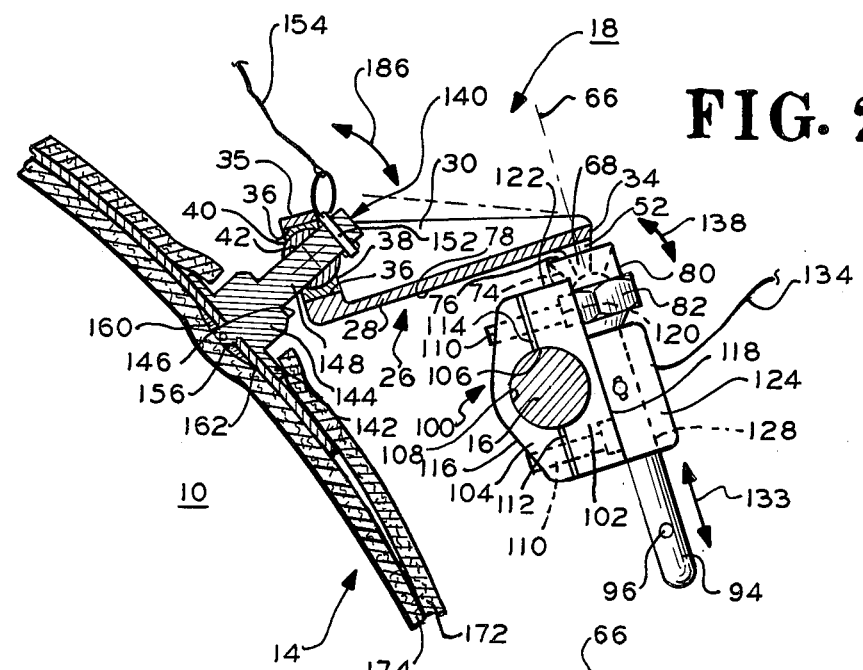
FIG. 2 is an elevation view partially in section taken along lines 2—2 of FIG. 4.

In FIG. 2 one connector 18 is shown whose construction is representative of the construction of the other connector 18', FIG. 6. Therefore only one connector 18 will be described. The connector 18 includes a primary link member 26 which comprises a U shaped channel having a bottom wall 28 and a pair of side walls 30, 32, FIG. 4. The walls 30, 32 taper to end 34, FIG. 3 and serve to strengthen the structure. Integral with bottom wall 28 and side walls 30, 32 is end wall 35 which is somewhat ring-like in shape with a cylindrical aperture 36. Wall 35 is at about right angles to channel walls 28, 30 and 32. Tightly secured in aperture 36 is an annular socket 38 which may be press fitted into aperture 36 in an interference fit. Socket 38 has a spherical seat 40. Secured in spherical seat 40 is ball 42. Ball 42 has a spherical exterior surface 44 which rotatably slides in seat 40. Ball 42 has a circular cylindrical opening 46 centered on the axis 48 of rotation of ball 42. Opening 46 has an axis 50 passing through axis 48. The ball 42 can rotate in any direction about its center 48.

Figure 3:
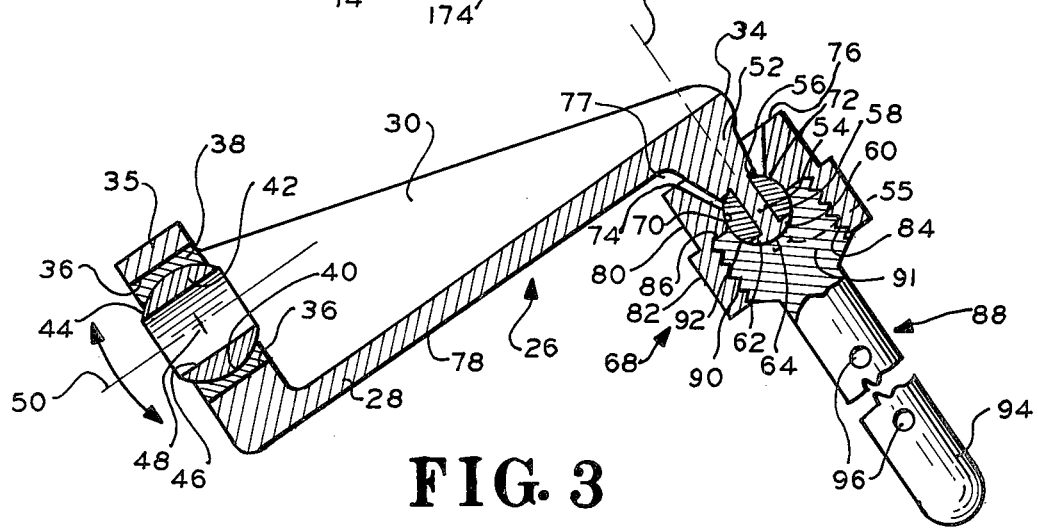
FIG. 3 is a sectional view of a portion of the connector of FIG. 2.

At end 34 of member 26 is a depending somewhat cylindrical leg 52, FIG. 3, which may also have a small taper. At the end of leg 52 is a stem 54 which is cylindrical and of smaller diameter than leg 52 forming an annular shoulder 56 on leg 52. Attached to stem 54 is ball 58 which closely receives stem 54. Ball 58 abuts shoulder 56. The end 55 of stem 54 (dashed line) is peened over shoulder 60 on ball 58 at 62 as shown in solid line. The peened portion 62 is rounded at surface 64 to form a continuous spherical ball surface. The portion 62 secures ball 58 to stem 54. The center of ball 58 is on axis 66 which, in this embodiment, is at about right angles to axis 50.

Ball seat nut 68 has a spherical seat 70 which mates with ball 58. The nut 68 has an opening 72 of slightly larger diameter than leg 52 but smaller than the diameter of ball 58. Thus nut 68 is captured to ball 58. Nut 68 opening 72 is at the lower edge of a conical wall 74 which increases in diameter as it extends away from ball 52 and opening 72. Leg 52 passes through the opening formed by conical wall 74 extending beyond the upper edge 76 of nut 68 adjacent wall 74. This creates a clearance 77 between lower surface 78 of wall 28 and edge 76. This clearance 77 permits nut 68 to pivot about the ball 58 center until conical wall 74 abuts the surface of leg 52. In other words, nut 68 can tilt with respect to axis 66 about the ball 58 center. Nut 68 is attached to ball 58 by first passing stem 54 through a cylindrical opening in ball 58 prior to peening stem 54 at portion 62. After ball 58 abuts shoulder 56, the end of stem 54 is peened securing the ball 58 and thus nut 68. Nut 68 has an outer cylindrical segment 80 and a nut segment 82 shaped to be grasped by a wrench. Nut 68 has an internally threaded aperture 84 centered on axis 66. Aperture 84 terminates at shoulder 86 adjacent seat 70.

Shaft 88 has threads 90 at end 91 which mate with the nut threads in aperture 84. The end of the thread end 91 of shaft 88 has a ball seat 92 which receives ball 58. When the threaded end 91 of shaft 88 abuts shoulder 86, seat 92 forms with seat 70 in nut 68 a spherical seat which permits ball 58 to rotate about the ball center. The ball can be loosely seated in seats 70 and 92. Shaft 88 is tightly secured against shoulder 86 so that it can not readily loosen in the presence of vibrations. A cylindrical pin 94 depends from threaded end 91. Pin 94 has several spaced holes 96 passing through pin 94, one being shown in FIG. 3.

The connector 18 also includes a clamp 100. Reference is made to FIGS. 2, 4 and 5 in the following description. Clamp 100 includes facing jaws 102, 104. Jaw 102 has a cylindrical recess 106 facing a cylindrical recess 108 in jaw 104. The two recesses 106, 108 receive shaft 16 therein and are clamped securely to shaft 16 by screws 110, the screws being threaded to jaw 104. Jaw 102 is a somewhat rectangular block which may be formed of aluminum. Jaws 102 and 104 have facing plane surfaces 112, 114 respectively. Jaw 104 may have an arcuate exterior surface 116. Recess 106 is in surface 112 and recess 108 is in surface 114. The recesses 106, 108 are dimensioned such that plane surfaces 112, 114 are in spaced relationships when the shaft 16 is secured to the jaws 102, 104. Jaw 104 may be made of aluminum and is sufficiently rigid so the surface 114 remains flat when the clamp is tightened. Screws 110 are at diagonally opposity positions in clamp jaws 102, 104 as seen in FIG. 4.

Upper surface 118 of jaw 102 is formed with a cylindrical recess 120 which is open to edge 122 or jaw 102. Recess 120 extends partially across jaw 102. A boss 124 is upstanding from surface 118 and extends from recess 120 to edge 126 opposite edge 122. Boss 124 has a cylindrical opening 128 which closely slideably receives pin 94 which passes through opening 128 as shown in FIG. 2. Boss 124 has an opening 130 transverse to and is aligned with opening 128. A selected one of the spaced holes 96 in pin 94 is aligned with transverse opening 130 when pin 94 is in opening 128. A locking pin 132 passes through opening 130 in boss 124 and hole 96 in pin 94 to lock the pin 94 to boss 124. Holes 96 provide selective adjustment of the spacing of ball 58, FIG. 3, in nut 68 relative to clamp 100, directions 133, FIG. 2. Locking pin 132 has a lanyard 134 secured to it, the lanyard being attached to the harness 14. Pin 132 has spring loaded detent balls 136 for securing pin 132 in jaw 102 opening 130. In FIG. 2, member 16 may rotate about axis 66 in a direction normal to the plane of the drawing sheet and may also tilt in directions 138 about the center of the ball seats 70 and 92 in nut 68. The tilting directions 138 can occur in any direction. The amount of tilt in directions 138 is limited by the conical surface 74 of nut 68 when it is contacted by leg 52 during the tilting action. Thus wall 35 of member 26 can move in any direction with respect to shaft 16. The length of walls 28, 30 and 32 set the spacing between shaft 16 and harness 14.

At the other end of member 26, ball 42 opening 46 receives a cylindrical pin 140, FIGS. 2 and 4. Pin 140 is secured to harness 14. In FIG. 7, pin 140 comprises a relatively plane disc-like member 142 from which extends cylindrical boss 144 having a shoulder 146 and a shaft 148. Shaft 148, which is cylindrical, extends from boss 144, shoulder 146 surrounding shaft 148. The diameter of shaft 148 is such that it is closely received in opening 46 in ball 42, FIG. 3. Shaft 148 has an opening 150 for receiving locking pin 152, FIG. 2, which is constructed similarly as locking pin 132, FIG. 4. Pin 152 is tied to harness 14 by lanyard 154, FIG. 2.

In FIG. 7, pin 140 includes a threaded stud 156 which depends from member 142. Stud 156 has an opening 158. A relatively flat nut 160 is threaded to the threads of stud 156 for securing pin 140 to plate 162. Plate 162 is a flat bendable sheet of metal, e.g., steel, having a hole 164 through which stud 156 passes. Nut 160 clamps disc-like member 142 to plate 162. A pin 166 passes through hole 158 in stud 156 and an aligned hole (not shown) in nut 160 to secure the nut 160 in place and prevent it from loosening.

In FIG. 8, plate 162 is a long member, for example, about 17 inches in one implementation, having a relatively short transverse dimension, for example, about 2 inches in that same implementation. The plate 162 is relatively thin so that it can readily bend, for example, about 0.05 inch thick. A pin 140 is secured to plate 162 at opposite ends as shown. Plate 162 also has holes 165 for receiving other attachments such as rings 168 and hook 170, FIG. 6.

In FIG. 2 plate 162 with pins 140 attached is sandwiched between leather layers 172, 174 of harness 14. Layers 172, 174 are stitched together to form the harness 14. Reinforcing leather layers (not shown) are also stitched to layers 172, 174 to form the harness 14 in a known manner. With plate 162 in place in harness 14, pins 140 are positioned symmetrically as shown in FIG. 6, with respect to the back of the animal at 176. In this manner pins 140 protrude from harness 14 such that shafts 148, FIG. 7, are symmetrically oriented at about the same angle with the horizontal, broken line 178. This angle may be at about 45° and may differ from this value in accordance with a given implementation.

In operation harness 14 is mounted to the horse's back and centered at 176, FIG. 6. The harness is secured in place with belly strap 180. Balls 42 of link connectors 18, 18' are then assembled to the respective shafts 148 or corresponding pins 140 and locked in place with pins 152 which are secured to harness 14 by lanyard 182, FIG. 4. Clamps 100, 100' are clamped to their respective sulky shafts 16, 16' and at the same time pins 94, FIG. 2, are inserted in openings 128 in boss 124 of the clamps. The pins 94 are inserted until a selected hole 96 is aligned with boss hole 130 as described above. The hole 96 selected depends on the desired spacing between sulky shaft 16 and the harness 14, FIG. 6, and the relative vertical positions of shaft 16 with respect to pin 140 adjacent that shaft 16. Member 26 can move in directions 138 and 186 with respect to clamp 100 and pin 144, respectively, about their corresponding balls 58, 42, FIG. 2.

In FIG. 6, during a race, the horse may rock in direction 190. The links 18, 18' permit this rocking action with respect to sulky shafts 16, 16' which remain in relative fixed spaced relation. This action permits the horse to lean, i.e., tilt sideways in one of directions 190 in a turn rather than remain upright as would occur otherwise with a harness fixed to shafts 16, 16'. Also, side-to-side motion, direction 192 is permitted by connectors 18, 18'. The side-to-side spaced relation of shafts 16, 16' can vary as these shafts are long and flexible in directions 192 where attached to connectors 18, 18'. Connectors 18, 18' can rock in any direction in response to such side-to-side horse motions or leaning of the horse in directions 190.

Further, because connectors 18, 18' permit rocking and side-to-side relative motions of the horse with respect to shaft 16, 16', the horse feels freer to move and it is believed can increase his speed. Further such side-to-side motion in prior and fixed harness-shaft connector systems tends to induce side slippage of the sulky and possible overturning of the sulky. During turns, as the horse traverses a curved path the relative front-to-rear positions of connectors 18, 18' at the pins 140 may differ from that at the clamps 100. This difference in front-to-rear positions of the two sides of the animal with respect to the sulky shafts in fixed systems is believed to induce side slipping of the sulky. Connectors 18, 18' tend to alleviate such side slipping thus possibly resulting in faster race times for a given animal. Further the relative leaning of the horse with respect to shafts 16, 16' is believed to alleviate possible lameness in the animal. This leaning action permits one pin 140 (and thus harness 14) to reposition to a lower or higher elevation with respect to shaft 16 and the other pin 140 to reposition the opposite relative elevation in directions 190, FIG. 6.

What is claimed is:

1. A harness connector for moveably coupling a shaft to a harness comprising:

a link member having first and second ends;

first articulated joint means connected to said link member at said first end, said joint means including means adapted to be connected to said harness for pivotally connecting the first end to said harness; and second articulated joint means connected to said link member at said second end, said second joint means including means adapted to be connected to said shaft for pivotally connecting the second end to said shaft whereby the link member can move relative to the shaft and harness to permit displacement of the harness relative to the shaft.

2. The connector of claim 1 wherein said first joint means comprises a pin including means for securing the pin to the harness and a ball bearing member pivotally secured to said link first end and adapted to releaseably engage said pin.

3. The connector of claim 1 wherein said second joint means comprises a clamp including means adapted to releaseably secure the clamp to said shaft, and ball and socket means including means for securing said ball to said second end, and for securing said socket to said clamp.

4. The connector of claim 3 wherein said socket means includes a shaft and said clamp includes means for releaseably securing said socket shaft thereto.

5. The connector of claim 3 wherein said means for securing the ball to said second end includes a member having a circular shape in section, and said socket includes a conical cavity for receiving said circular shaped member, said member and joint cavity being dimensioned such that said member can tilt within said cavity as said ball rotates in said socket.

6. The connector of claim 1 wherein said first ball joint means includes a ball and socket and means connecting one of said ball and socket to said first end in a first direction and said second ball joint means includes a ball and socket, said latter ball and socket receiving connecting means adapted to be attached to said harness, said latter ball and socket including means receiving said connecting means in a direction at an angle with regard to said first direction.

7. A connector for coupling a shaft to a harness comprising:

a clamp including means for releaseably securing the clamp to said shaft;

a pin adapted to be secured to said harness;

a link member;

first and second spaced ball joint means secured to said link member;

said first ball joint means including means for releaseably securing that ball joint means to said pin, said second ball joint means including means for releaseably securing the second ball joint means to said clamp.

8. The connector of claim 7 wherein said first ball joint means comprises a spherical seat in said link member and a ball rotatably secured in said seat, said ball having an aperture for closely slideably receiving said pin, said second ball joint means comprising ball means depending from said link member and a spherical socket of said ball means rotatably securing the ball thereto, said socket including means engaging said ball means for limiting the angular tilting of said ball means in said socket about a first axis.

9. The connector of claim 8 wherein said pin has a long axis which extends in a direction generally non-parallel to said first axis.

10. The connector of claim 7 wherein said means for releaseably securing the second ball joint means includes a second shaft secured to said second ball joint means, said clamp having an aperture for closely receiving said second shaft and means for releaseably locking said second shaft to said clamp in at least one position along the length of that second shaft.

11. The connector of claim 7 wherein said second ball joint means comprises a ball and an arm connected to the ball, the arm being secured to the link member, a socket including a ball seat for said ball and a conical cavity through which said arm passes, and a connector pin attached to the socket, said clamp including means for securing said connector pin thereto.

12. The connector of claim 11 wherein said socket comprises a body having a spherical ball seat and a threaded aperture adjacent said spherical ball seat, said connector pin having a threaded end for engaging said threaded aperture and a spherical ball seat at the end of said connector pin adapted to form said ball seat in cooperation with said body spherical ball seat.

13. A harness system for coupling a cart to an animal comprising:
a harness strap for encircling the body of said animal,
first and second connector means secured to the harness, and
first and second connecting links, the first link including first means adapted to couple one of said connector means to a first cart shaft, the second link including second means adapted to couple the other of said connector means to a second cart shaft, said links coupling said harness to said shafts,
each of said connecting links comprising a link member connected to its corresponding connecting means by a first articulated joint and to its corresponding shaft by a second articulated joint spaced from the first joint.

14. The system of claim 13 wherein the first articulated joint includes a ball which slideably engages its corresponding connector means and means for releaseably securing that ball to its connector means and the second joint includes a ball attached to its link member and a socket including means for limiting the angular movement of said second ball joint and further including clamp means for clamping said socket to its corresponding shaft.

15. A harness connector for moveably coupling a shaft to a harness comprising:
a link member having first and second ends;
first ball joint means including means for pivotally connecting the first end to said harness; and
second ball joint means including means for pivotally connecting the second end to said shaft whereby the link member can move relative to the shaft and harness to permit displacement of the harness relative to the shaft, said second ball joint means comprising:
a clamp including means for releaseably securing the clamp to said shaft, and ball and socket means including means for securing one of said ball and socket to said second end, and for securing the other of said ball and socket to said clamp.

16. The connector of claim 15 wherein said ball and socket means includes a shaft and said clamp includes means for releaseably securing said ball and socket means shaft thereto.

17. The connector of claim 15 wherein said means for securing one of said ball and socket to said second end includes a member having a circular shape in section, and said socket having a conical cavity for receiving said circular shaped member, said member and cavity being dimensioned such that said member can tilt within said cavity as said ball rotates in said socket.

18. The connector of claim 15 wherein said first ball joint means includes a second ball and socket and means connecting one of said second ball and socket to said first end in a first direction, said second joint means includes a ball and socket for receiving connecting means adapted to be attached to said harness, said latter ball and socket including means for receiving said connecting means in a direction at an angle relative to said first direction.

19. A harness system for coupling a cart to an animal comprising:
a harness strap for encircling the body of said animal,
first and second pins secured to the harness, and
first and second connecting links, the first link for coupling one of said pins to a first cart shaft, the second link for coupling the other pin to a second cart shaft, said links coupling said harness to said shafts,
each of said connecting links comprising a link member connected to its corresponding pin by a first ball joint and to its corresponding shaft by a second ball joint, said first ball joint including a ball which slideably engages its corresponding pin and means for releaseably securing that ball to its pin, said second ball joint including a ball attached to its link member and a socket including means for limiting the angular movement of said second ball joint and further including clamp means for clamping said socket to its corresponding shaft.

20. A harness connector system for coupling a horse to a cart, said cart including a pair of shafts positioned to straddle said horse, said system comprising:
a harness adapted to be secured around the midsection of said horse; and
a pair of harness connectors, one for connecting one shaft to the harness and the other for connecting the other shaft to the harness, said connectors each comprising:
first connector means secured to said harness;
second connector means adapted to be secured to the corresponding one of said shafts; and
link means secured to said first and second connector means, said link means including means adapted to permit said first connector means to move tangentially relative to said second connector means in a first direction and to move toward and away from said connector means in a second direction.

21. The system of claim 20 wherein said link means includes first articulated joint means adapted to permit said second connector means to rotate relative to a first axis adjacent said first connector means and second articulated joint means adapted to permit said first connector means to rotate relative to a second axis spaced from the first axis and adjacent said second connector means.

22. A connector for coupling a shaft to a harness comprising:
a clamp including means for releaseably securing the clamp to said shaft;

connector means adapted to be secured to said harness;

a link member;

first and second spaced articulated joint means secured to said link member;

said first joint means including means for releaseably securing that joint means to said connector means, said second joint means including means for securing the second joint means to said clamp.

23. An animal harness connector for coupling a harness to a cart shaft comprising:

first connector means adapted to be secured to said harness;

a second connector means adapted to be secured to said cart; and link means secured to the first and second connector means, said link means including means adapted to permit said first connector means to rotate relative to said second connector means about at least one first axis and about at least one second axis spaced from the first axis such that said first and second connector means can move toward one another in one direction and tangentially relative to each other in a second direction.

* * * * *